Jan. 25, 1949.  H. A. WAGNER ET AL  2,459,980
SCOOP TRUCK

Filed March 12, 1946  2 Sheets-Sheet 1

Harold A. Wagner
Gustave H. Wagner
INVENTORS

BY
ATTORNEY

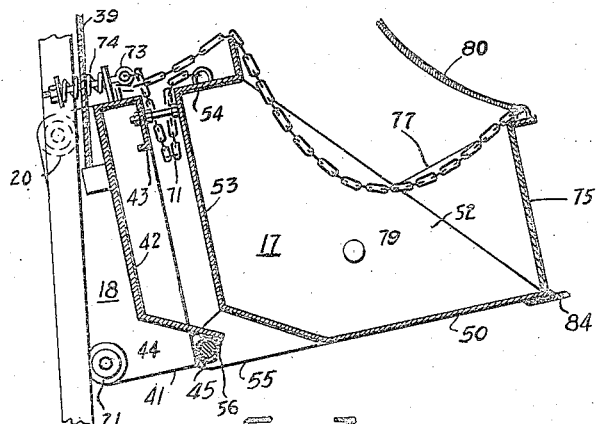
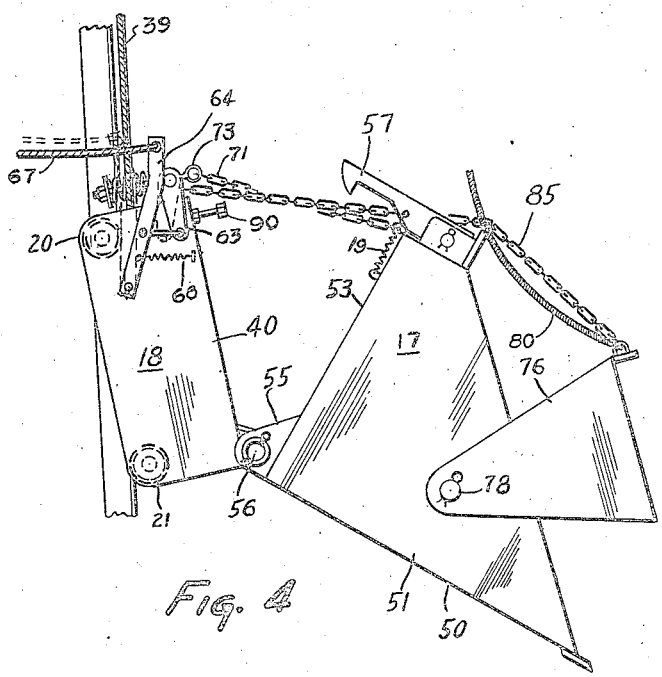
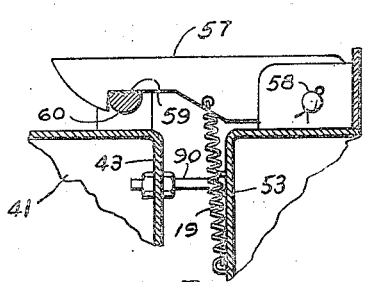

Patented Jan. 25, 1949

2,459,980

UNITED STATES PATENT OFFICE 2,459,980

SCOOP TRUCK

Harold A. Wagner and Gustave H. Wagner, Portland, Oreg.

Application March 12, 1946, Serial No. 653,747

4 Claims. (Cl. 214—120)

The present invention relates to material handling apparatus and more particularly to a scoop truck for handling bulk materials.

Bulk material, such as coal, sand, dirt, snow and the like is frequently required to be picked up from the ground and moved to another location. Suitable scoop trucks or lift trucks for such purposes comprise a prime mover vehicle having an elevator tower structure mounted on the forward end thereof, upon which the load lifting element such as a scoop is vertically movable. However when such apparatus is used to move finely divided materials such as sand, dirt, pulverized coal, grain or the like from one point to another, particularly when such materials are being moved over rough or uneven surfaces, the ordinary open ended scoop is not satisfactory for the purpose in that much of the load is lost during transportation due to the tilting and jolting of the vehicle.

It is a general object of the present invention to provide a new and improved vehicle-mounted scoop apparatus for handling and hauling loose, bulk material.

A further object of the invention is to provide a new and improved utility truck vehicle which is particularly suitable for scooping bulk material from the ground and moving the bulk material to another location.

Another object is to provide a new and improved scoop arrangement for transporting bulk materials.

A still further object is to provide a new and improved scoop arrangement having means whereby bulk materials picked up by the scoop can be retained therein during transportation, which means is so designed as not to interfere with the dumping or unloading of the scoop.

A further object is to provide a new and improved and highly maneuverable scoop arrangement which is simple in design and low in manufacturing costs.

In accordance with the illustrated embodiment, the scoop truck comprises a vehicle having an upright structure on the front thereof. A scoop is provided upon the upright structure, it being supported upon a carriage which is arranged for vertical movement upon the upright. The scoop is pivotally mounted upon the carriage and is normally retained in a substantially horizontal position except when it is desired to unload the scoop when it is caused to tilt forwardly to a dumping position. Pivotally mounted on the scoop for closing the open or forward end thereof is a gate so constructed and arranged that it is automatically opened during the scooping and dumping operations and closed or substantially closed during transportation.

Figure 1:
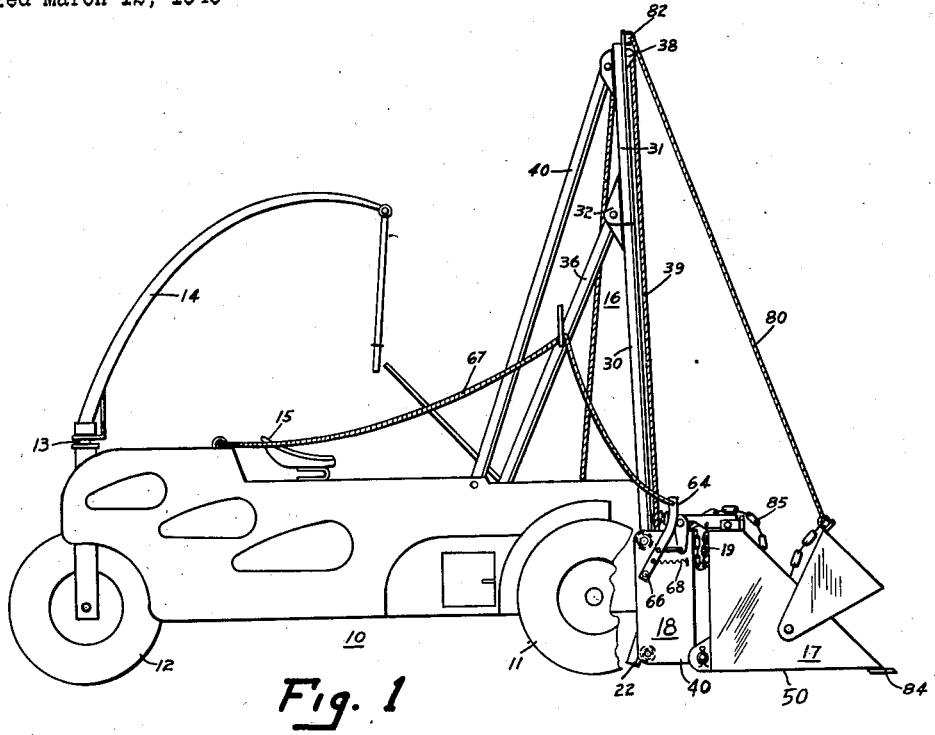
Figure 2:
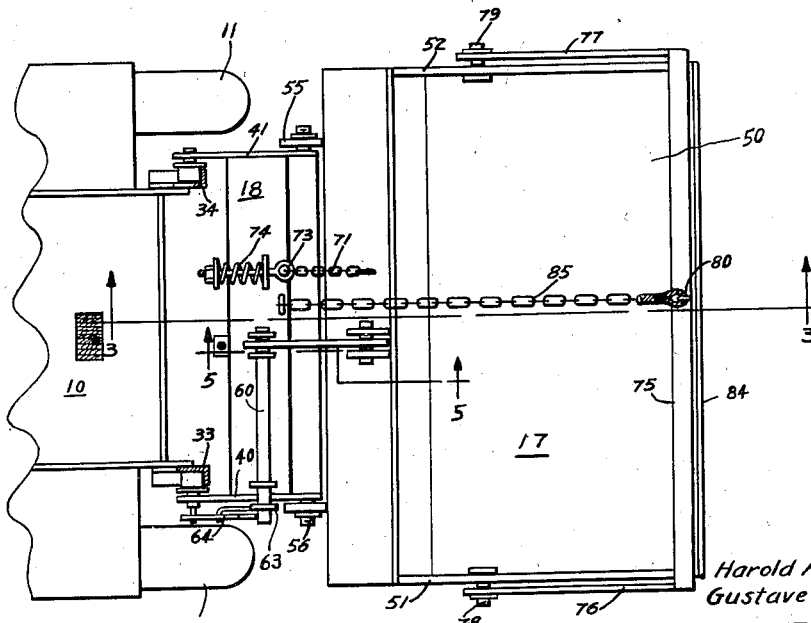

In the drawings, Fig. 1 is a side elevation of the apparatus of the invention constructed in accordance with one form thereof; Fig. 2 is a fragmentary detail plan view of the scoop and carriage therefor with the gate in a lowered position; Fig. 3 is a cross-sectional view of the scoop arrangement taken generally along lines 3—3 of Fig. 2 with the scoop and carriage in an elevated position; Fig. 4 is a fragmentary detail view illustrating the scoop in an elevated and dumping position; and Fig. 5 is a fragmentary view illustrating certain details of the latching means employed for holding the scoop in the upright condition.

Referring particularly to Figs. 1 and 2 of the drawings a vehicle is illustrated including a body frame 10 having a pair of relatively widely spaced front wheels 11 which are adapted to be driven by the engine (not shown) mounted within the body 10. The rear end of the vehicle is supported by a single rear wheel 12 mounted upon the lower end of a vertically arranged column 13 which is arranged for free rotation about a vertical axis, a tiller arm 14 being connected to the upper end of the column 13 by means of which steering movements of the vehicle may be controlled by a driver positioned upon the seat 15. A tower structure indicated generally at 16 is mounted upon the forward end of the vehicle 10 and a scoop 17 supported by a carriage 18 is arranged for vertical movement upon the tower structure.

The tower structure 16 comprises a lower section 30 and an upper section 31 hingedly mounted as at 32 onto the upper end of the lower section. Both sections are comprised of a pair of relatively heavy cross-braced angle iron uprights, the angle irons of the lower section being indicated by numerals 33 and 34. These irons are so arranged that the forward flanges extend in a common plane and away from each other defining tracks for the rollers 20 and 21 of the scoop carriage 18. The other flanges of the angle iron members extend rearwardly of the vehicle and are welded directly to the opposite sidewalls of the vehicle body adjacent the foremost edges thereof.

The lowermost ends of the angle iron members 33 and 34 are curved rearwardly as indicated at 22 in Fig. 1 in order to cause a downwardly tilting of the scoop in the lowermost position thereof whereby the forward edge of the scoop is brought substantially into contact with the ground.

The upper ends of the angle iron members 33 and 34 are braced by rearwardly extending braces 36 which are welded at opposite ends to the corresponding tower members and the vehicle body sidewalls respectively. The upper section 31 of the tower is provided with a crosshead having a sheave block 38 secured thereto around which is trained a cable 39. The cable 39 is connected at one end to a winch drum (not shown) provided within the forward portion of the vehicle body and at its other end to carriage 18. The upper section is braced in an upright position by a pair of removable angle iron braces 40 extending from the uppermost end of section 31 to the rearward portions of the sidewalls of the vehicle body. The braces 40 can be removed when desired to decrease the over-all height of the tower so that section 31 can be folded back into contact with braces 36, the crosshead and sheave 38 then being transferred to the upper end of the lower section 30.

The carriage 18 comprises a pair of parallel rectangular steel side plates 40 and 41 and a unitary cross member 42 spacing plates 40 and 41 apart and rigidly welded thereto along the side edges thereof. The cross member comprises a vertically extending back portion and a channel shaped upper end including a depending forward flange portion 43. Beneath the sloping foremost edge of the lower portion of the member 42 and extending across the width of the carriage in front of the side plates 40 and 41 is a tubular member 45 which is welded to the forward edges of the plates and the edge of the cross member 42 and which is adapted to receive a removable shaft 56. The flanged rollers 20 and 21 are rotatably mounted on the inside rear portion of plates 40 and 41, the upper rollers 20 being arranged for riding on the rear surface of the upright angles 33 and 34 and the lower rollers 21 being arranged to ride on the front surfaces of these angles.

The scoop 17 is of a width preferably substantially equal to or greater than the width of the front wheel assembly and comprises a bottom 50, opposite sidewalls 51 and 52, a rear wall 53 and an upper wall 54 extending over the rearmost portion only of the scoop. The scoop is mounted on carriage 18 for movement between a generally horizontal loading position and a tilted or dumping position. Rigidly secured as by welding to the lower rear corners of the scoop are a pair of rearwardly extending bracket arms 55 which are loosely journaled upon the ends of the transversely extending shaft 56 removably extending through tubular member 45. The scoop is normally restrained against pivotal movement about shaft 56 by means of a latch hook 57 shown in detail in Fig. 5. The latch is pivotally secured as by pin 58 to lugs welded to the upper wall portion of the scoop and is biased downwardly by spring 19. The end of the hook is adapted to engage behind a cooperating shoulder formed by flattened portion 59 on the latch control shaft 60, this shaft being rotatably supported by suitable brackets welded to the upper wall portion of the carriage cross member 42.

Rotation of shaft 60 in a clockwise direction as viewed in Fig. 5, releases latch hook 57 from the shoulder 59. Means for effecting rotation of shaft 60 comprises a lever arm 63 (Fig. 4) having one end fixed to the end of shaft 60 and the other connected by a link to the central portion of a second lever arm 64. The lower end of lever arm 64 is pivotally secured to the sidewall 40 of the carriage while a manual control rope 67 is secured to the upper end of the arm. Spring 68 secured between lever arm 64 and the side of the carriage serves to bias the shaft 60 in a counterclockwise direction as viewed in Figs. 4 and 5, the forward travel of lever arm 64 being limited by contact with the end of shaft 60. When the latch 57 is released from the shoulder 59, the scoop will be freed for tilting to the dumping position illustrated in Fig. 4. Forward tilting movement of the scoop is restricted by means of chain 71 secured at one end to the upper wall of the scoop, and at the other end to eye-bolt assembly 73 arranged on the upper wall portion of the carriage cross member. Spring 74 arranged around the eye bolt resiliently arrests the scoop in a predetermined tilted position. The scoop is automatically returned to the horizontal position upon lowering of the carriage and engagement of the scoop with the ground whereupon the latch 57 will automatically hook behind the squared shoulder 59 on shaft 60, the shaft having been returned to latching position by means of spring 68 after release of the tension on rope 67. Rearward pivotal movement of the scoop is limited by the adjustable stop 90 secured in the depending flange 43 of the carriage unit.

Extending transversely across the forward or open end of the scoop is a gate 75 in the form of a relatively heavy rectangular steel sheet. Extending rearwardly from each end of the gate outside the sidewalls of the scoop are pivot arms 76 and 77, the rearmost ends of which are pivotally connected to the sidewalls 51 and 52 of the scoop by means of pins 78 and 79. Normally, when the scoop is in an elevated position the gate rests on the bottom of the scoop adjacent the forward ends of the sidewalls of the scoop. For automatically raising the gate to an open position when the scoop is lowered into contact with the ground there is provided a rope or cable 80, one end of which is connected to the gate and the other end of which is connected to the top of the tower structure 16 as indicated at 82. The cable 80 is of such a length that when the scoop is in its lowered position the gate will be raised as shown in Fig. 1 to permit loading of the scoop.

As illustrated in Fig. 1 the lowermost ends 22 of the angle members 33 and 34 of the upright structure are bent slightly rearwardly so that as the scoop carriage is dropped to the lowermost position, the foremost scoop edge is directed at a slightly downward angle from a horizontal plane for the purpose of bringing the front edge of the scoop into engagement with the ground to facilitate the picking up of bulk material from the ground ahead of the vehicle. After the scoop is filled it is raised by means of cable 39. As the scoop carriage is raised upwardly and the lower rollers 21 pass above the rearwardly bent lower ends 22 of the angle irons the front end of the scoop is tilted upwardly at a slight angle above the horizontal as is illustrated in Fig. 3 and at the same time gate 75 drops to the closed position due to the slack in cable 80. If the material which has been loaded into the scoop is finely divided and easily displaced the gate, will drop into a fully closed position. On the other hand with some materials, such as dirt or gravel, containing some larger pieces the gate may drop only part-way through the material, but in either case it will effectively retain the material within the scoop and prevent any substantial spilling thereof during transportation. When transporting the scoop full of material over a distance it is preferable to raise it to a position only a few feet above the ground so that the center of gravity of the load will be maintained reasonably low.

When it is desired to dump the load from the scoop the latch 57 is released to permit forward and downward pivotal movement of the scoop to the position shown in Fig. 4. If it is desired to dump the material into an elevated hopper or into a dump truck body, the scoop may be raised to a point high on the upright structure and the vehicle driven forwardly so that the foremost edge of the scoop overhangs the sidewall of the receptacle before the latch 57 is released.

For automatically lifting the gate as the scoop is released to a dumping position, a chain 85 of predetermined length, is connected between the gate and the top of the carriage. This chain is only of sufficient length to permit the lowering of gate 75 to the fully closed position when the scoop extends horizontally. Upon forward tilting movement of the scoop, the gate 75 is restrained by chain 85 as shown in Fig. 4.

It will be obvious that during the downward travel of the carriage and scoop subsequent to a dumping operation, gate 75 is held in an open position first by chain 85 and finally by cable 80.

By detaching cable 80, gate 75 will assume a closed position when the scoop is in a lowered position so that the closed scoop can then be used for dozing operations, the lowered gate acting in the nature of a dozer element. The apparatus is also particularly useful as a concrete hopper. When so used the scoop, with the gate closed, is loaded in the horizontal position and unloaded by tripping the latch to permit the scoop to tilt while the gate is held in a substantially horizontal and open position by means of chain 85.

Having described the invention in what are considered to be preferred embodiments thereof it is desired that it be understood that the specific details shown are merely illustrative and that the invention may be carried out in other ways without departing from the spirit and scope of the following claims.

What we claim is:

1. A material handling truck, an upright secured to the forward end of said truck, a carriage mounted on said upright for vertical movement with respect thereto, a scoop having its open end forward and comprising a bottom and sidewalls, said scoop being pivotally mounted on said carriage and having a loading position in which the scoop is in a lowered position with the bottom of said scoop in a generally horizontal plane and a dumping position wherein the scoop and carriage are in a raised position with the scoop tilted forwardly and downwardly away from said carriage, a gate extending across the open end of said scoop and pivotally mounted on said scoop for vertical movement with respect to the bottom of said scoop, flexible means connecting said gate to the upper portion of said upright and of such length as to hold the gate in an open position when said scoop is in the lowered, loading position, and a second flexible means connecting said gate to said carriage and of such length as to hold the gate in an open position with respect to the scoop when said scoop is in the dumping position.

2. A bulk material handling device comprising a vehicle including a frame, an upright secured to the frame, a carriage mounted on said upright for vertical movement with respect thereto, a scoop having an open forward end and including a bottom and sidewalls, said scoop being pivotally connected at its rearward end to said carriage for pivotal movement between a horizontal loading position and a tilted dumping position, a gate extending transversely of the open end of said scoop and being pivotally connected to said scoop for pivotal movement between lowered and raised positions with respect to the bottom of said scoop, flexible means secured to said gate and to said upright adjacent the upper end thereof, said flexible means being of a length adapted to maintain said gate in a raised position when the scoop is adjacent the lower end of said upright, and limiting means interconnecting said gate and carriage for limiting the downward movement of said gate when the scoop is tilted to a dumping position.

3. A bulk material handling device comprising a vehicle including a frame, an upright secured to the frame, a carriage mounted on said upright for vertical movement with respect thereto, a scoop having an open forward end and including a bottom and sidewalls, said scoop being pivotally connected at its rearward end to said carriage for pivotal movement between a horizontal loading position and a dumping position, a gate extending transversely of the open end of said scoop and being pivotally connected to the sidewalls of said scoop for pivotal movement between lowered and raised positions with respect to the bottom of said scoop, flexible means secured to said gate and to said upright adjacent the upper end thereof, said flexible means being of a length adapted to retain said gate in a raised position when the scoop is in a loading position adjacent the lower end of said upright, a second flexible means secured at one end to said gate and at the other to said carriage, said second flexible means being of a length such that when the scoop is in a dumping position said gate will be held in the raised position with respect to the bottom of said scoop.

4. A material handling truck, an upright secured to the forward end of said truck, a carriage mounted on said upright for vertical movement with respect thereto, a scoop having its open end forward, said scoop being pivotally mounted on said carriage and having a loading position in which the scoop is in a lowered position wth the bottom of said scoop in a generally horizontal plane and a dumping position wherein the scoop and carriage are in a raised position with the scoop tilted forwardly and downwardly away from said carriage, a gate extending across the open end of said scoop, a pair of arms extending rearwardly from the ends of said gate, the rearmost portion of said arms being pivotally connected to the sides of said scoop, flexible means connecting said gate to the upper portion of said upright and adapted to limit the downward travel of said gate as the scoop approaches its loading position and a second flexible means connecting said gate to said carriage and adapted to limit the downward travel of said gate as the scoop is tilted forwardly to the dumping position.

HAROLD A. WAGNER.
GUSTAVE H. WAGNER.

REFERENCES CITED

The following references are of record in the file of this patent:

UNITED STATES PATENTS

| Number | Name | Date |
|---|---|---|
| 1,851,234 | Ball | Mar. 29, 1932 |
| 2,210,323 | Lambert | Aug. 6, 1940 |
| 2,249,356 | Goodman | July 15, 1941 |
| 2,312,390 | Cordes | Mar. 2, 1943 |
| 2,328,715 | Drott | Sept. 7, 1943 |
| 2,386,519 | Wagner et al. | Oct. 9, 1945 |
| 2,387,656 | Gledhill | Oct. 23, 1945 |